US011526267B2

(12) United States Patent
Hanamoto

(10) Patent No.: US 11,526,267 B2
(45) Date of Patent: Dec. 13, 2022

(54) SETTING APPARATUS, SETTING METHOD, AND STORAGE MEDIUM

(71) Applicant: CANON KABUSHIKI KAISHA, Tokyo (JP)

(72) Inventor: Takashi Hanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/202,320

(22) Filed: Nov. 28, 2018

(65) Prior Publication Data

US 2019/0163356 A1 May 30, 2019

(30) Foreign Application Priority Data

Nov. 30, 2017 (JP) .............................. JP2017-229879

(51) Int. Cl.
*G06F 3/0484* (2013.01)
*G06F 3/0481* (2013.01)
*H04N 13/10* (2018.01)
*G06F 3/04847* (2022.01)
*G06F 3/04815* (2022.01)

(52) U.S. Cl.
CPC ...... *G06F 3/04847* (2013.01); *G06F 3/04815* (2013.01); *H04N 13/10* (2018.05)

(58) Field of Classification Search
CPC ....... H04N 21/2343; H04N 21/234345–23439
See application file for complete search history.

(56) References Cited

U.S. PATENT DOCUMENTS

| | | | | |
|---|---|---|---|---|
| 2005/0018045 A1* | 1/2005 | Thomas | ................. | G06K 9/209 348/157 |
| 2006/0146132 A1* | 7/2006 | Mayerson | .............. | H04N 7/181 348/143 |
| 2007/0041659 A1* | 2/2007 | Nobori | ................... | H04N 7/181 382/284 |
| 2008/0259162 A1* | 10/2008 | Aoki | ....................... | G06K 9/32 348/159 |
| 2010/0232499 A1* | 9/2010 | Reme | ..................... | H04N 19/14 375/240.12 |
| 2011/0032252 A1* | 2/2011 | Ohta | .................... | H04N 13/398 345/419 |
| 2012/0154593 A1* | 6/2012 | Anderson | ............. | H04N 7/185 348/157 |

(Continued)

FOREIGN PATENT DOCUMENTS

JP 4671873 B2 4/2011

*Primary Examiner* — John W Miller
*Assistant Examiner* — Humam M Satti
(74) *Attorney, Agent, or Firm* — Canon U.S.A., Inc. IP Division

(57) ABSTRACT

A setting method for setting a parameter of a virtual viewpoint relating to a virtual viewpoint video to be generated based on images captured by a plurality of cameras includes receiving a first user operation relating to a first parameter relating to a position of a virtual viewpoint, determining a settable range of a second parameter of the virtual viewpoint by using the first parameter based on the received first user operation, and setting the first parameter based on the received first user operation and the second parameter that is based on a second user operation different from the first user operation and falls within the determined settable range as parameters of the virtual viewpoint.

15 Claims, 13 Drawing Sheets

(56) References Cited

U.S. PATENT DOCUMENTS

| | | | |
|---|---|---|---|
| 2012/0188452 A1* | 7/2012 | Keiser | G06T 13/00 348/559 |
| 2014/0085203 A1* | 3/2014 | Kobayashi | G01S 19/14 345/158 |
| 2014/0195914 A1* | 7/2014 | Gillard | H04N 21/632 715/719 |
| 2014/0362078 A1* | 12/2014 | Yamada | G06T 15/00 345/419 |
| 2015/0085131 A1* | 3/2015 | Anderson | H04N 5/23216 348/157 |
| 2015/0145891 A1* | 5/2015 | Kuffner | G06T 15/20 345/649 |
| 2015/0243086 A1* | 8/2015 | Denis | G06F 3/011 345/633 |
| 2015/0258935 A1* | 9/2015 | Nagata | H04N 7/181 348/148 |
| 2015/0264258 A1* | 9/2015 | Bervoets | H04N 7/181 348/36 |
| 2015/0317822 A1* | 11/2015 | Haimovitch-Yogev | H04N 13/0059 345/419 |
| 2015/0326932 A1* | 11/2015 | Hill | H04N 21/8146 725/32 |
| 2015/0350606 A1* | 12/2015 | Khanfor | H04N 5/247 348/157 |
| 2016/0127692 A1* | 5/2016 | Yoneji | G06K 9/00664 348/159 |
| 2016/0364885 A1* | 12/2016 | Fathi | G06T 7/579 |
| 2017/0026680 A1* | 1/2017 | Sugio | H04N 21/2187 |
| 2017/0205061 A1* | 7/2017 | Broers | F21V 21/15 |
| 2017/0264920 A1* | 9/2017 | Mickelsen | H04N 21/44008 |
| 2018/0018510 A1* | 1/2018 | Williams | G06T 7/38 |
| 2018/0109751 A1* | 4/2018 | Choi | G06F 1/1694 |
| 2018/0302610 A1* | 10/2018 | Masuda | H04N 13/243 |
| 2019/0087068 A1* | 3/2019 | Noguchi | G06F 3/04815 |
| 2019/0155481 A1* | 5/2019 | DiVerdi | G06F 3/011 |

\* cited by examiner

FIG.3
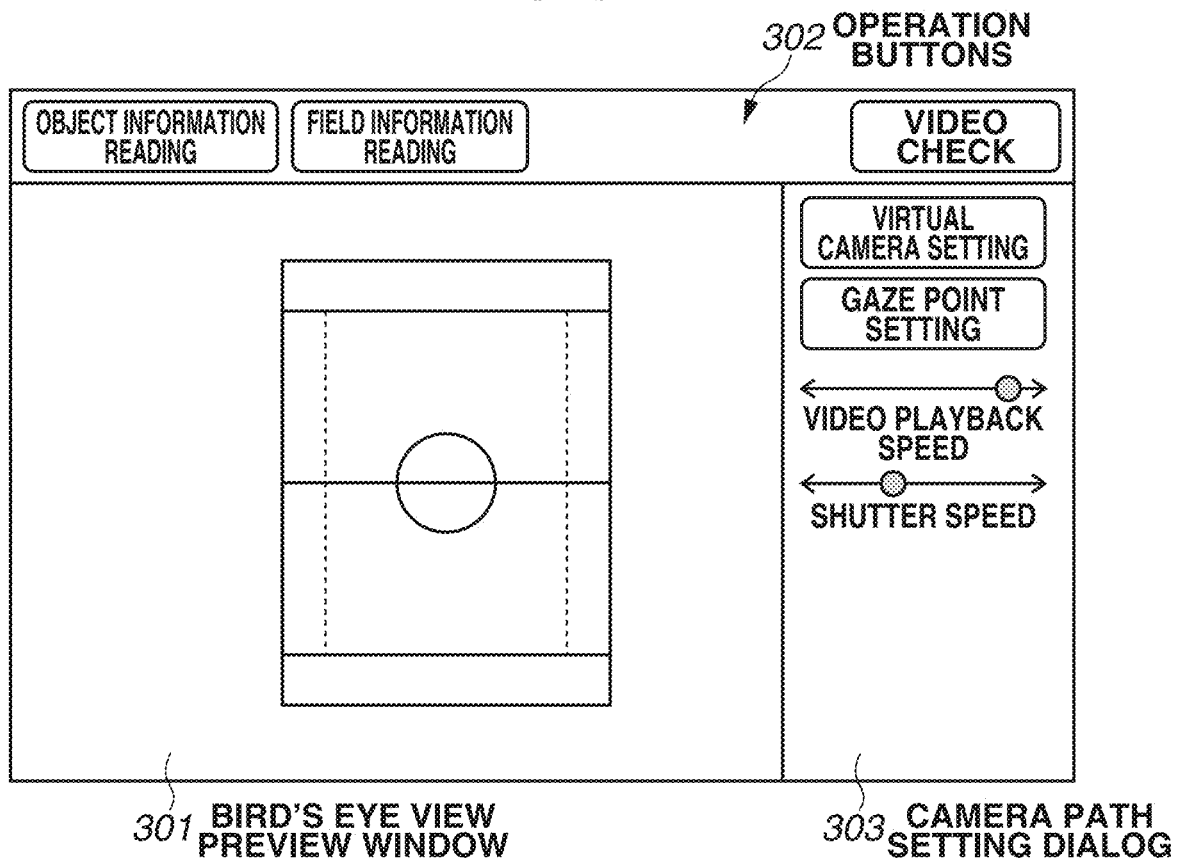
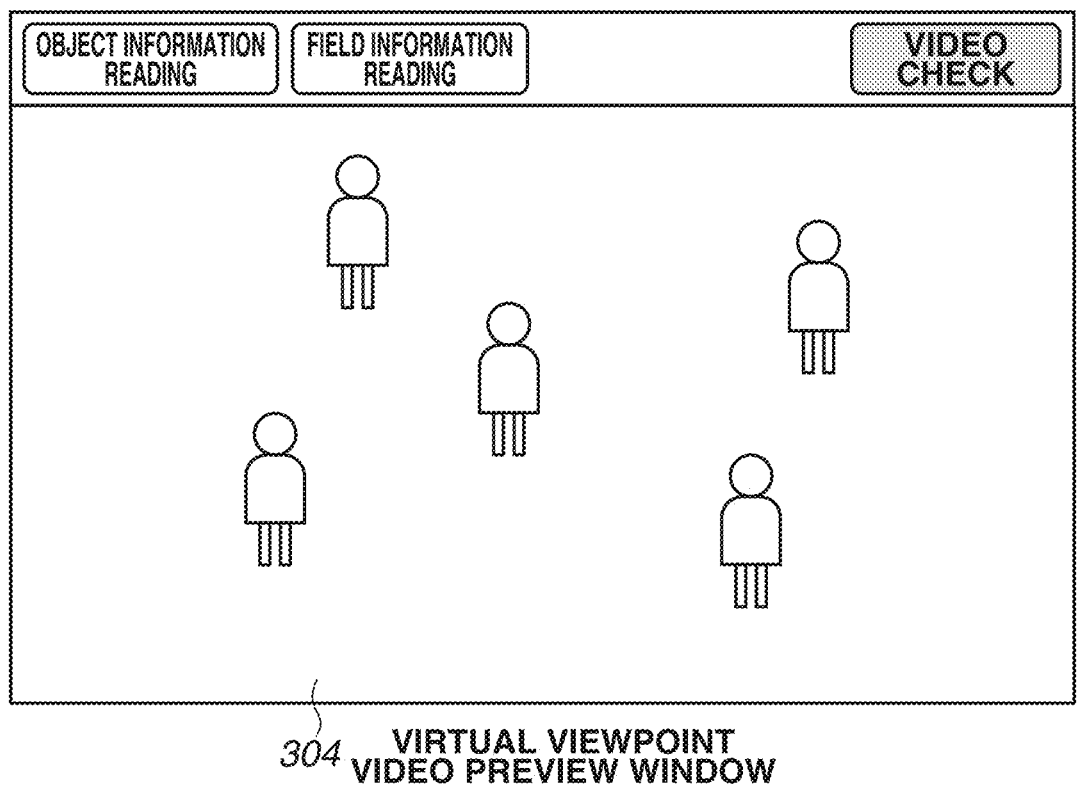

FIG.9
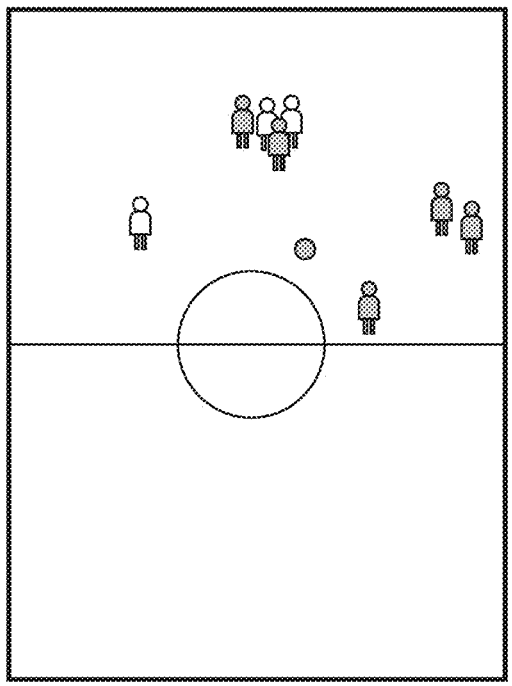
*901* BIRD'S-EYE VIEW
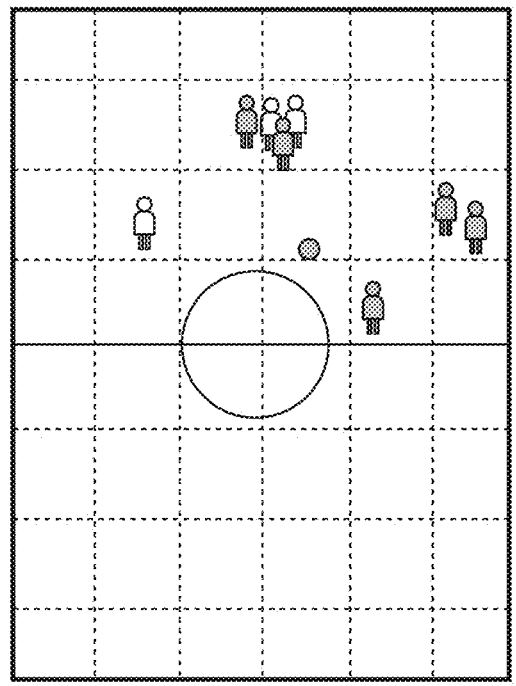
*902* BLOCK DIVISION RESULT
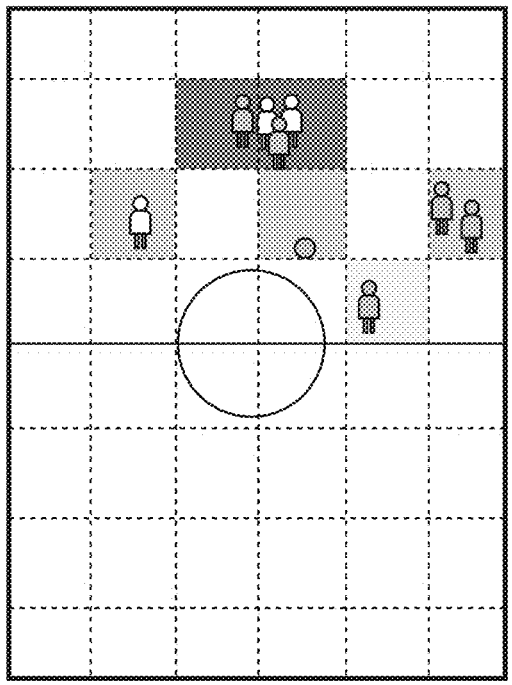
*903* DIFFICULTY-DEGREE
VISUALIZATION
RESULT (t=1)
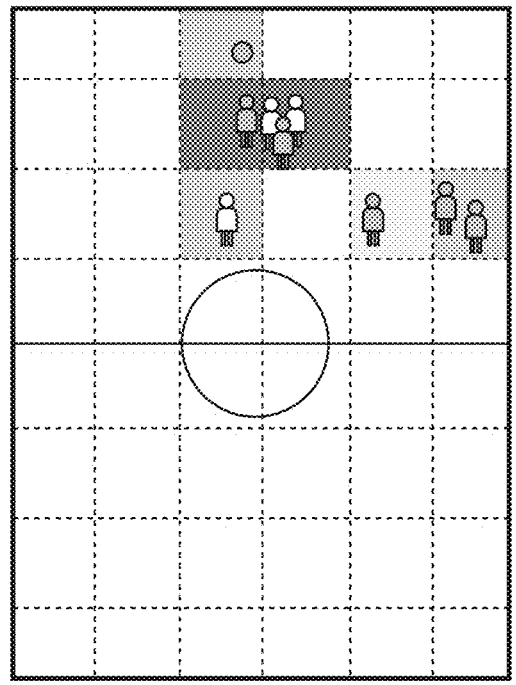
*904* DIFFICULTY-DEGREE
VISUALIZATION
RESULT (t=2)

FIG.10
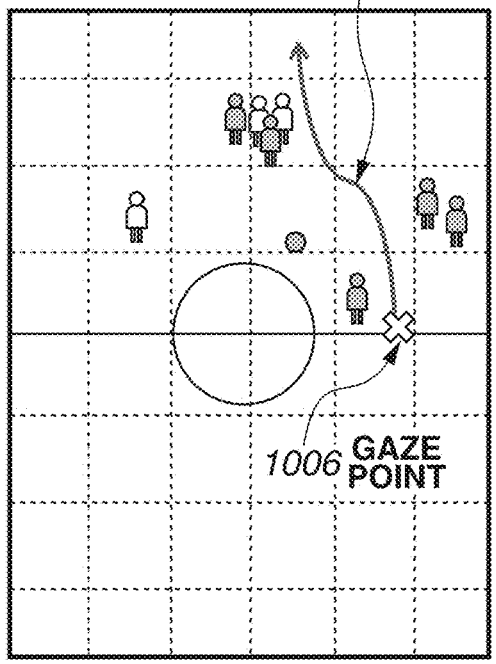
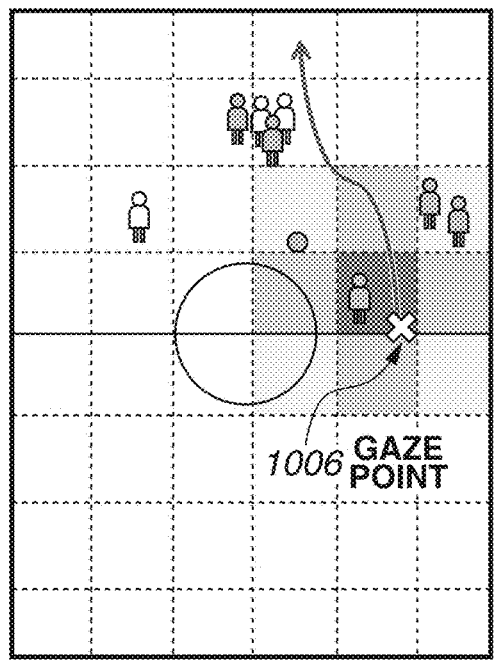
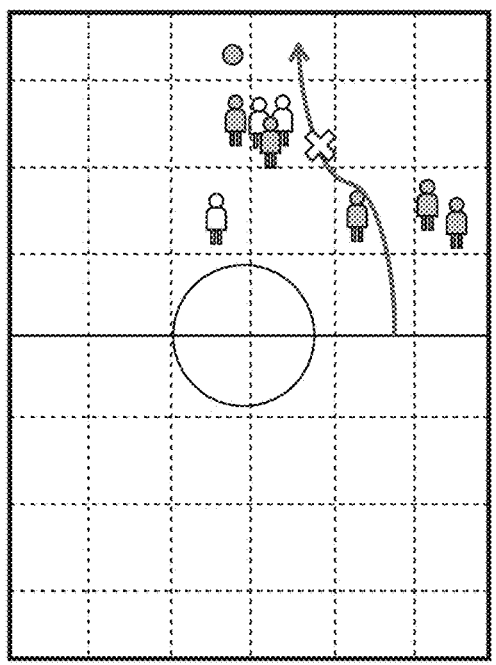
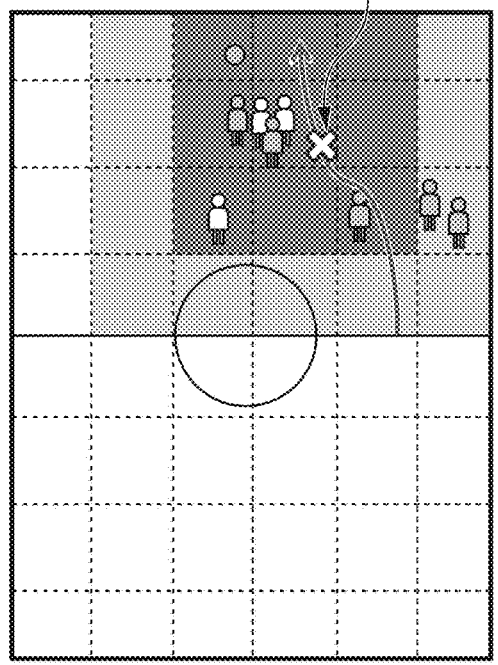

FIG.11
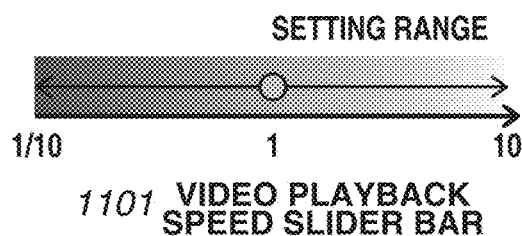
1101 VIDEO PLAYBACK SPEED SLIDER BAR
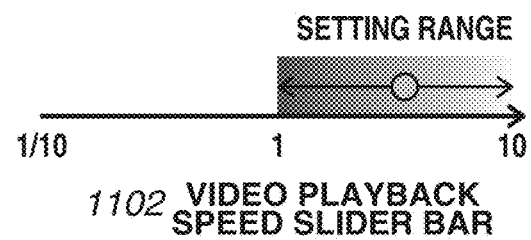
1102 VIDEO PLAYBACK SPEED SLIDER BAR
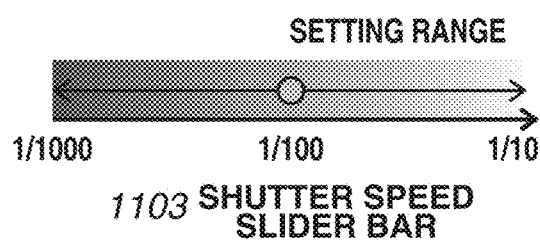
1103 SHUTTER SPEED SLIDER BAR
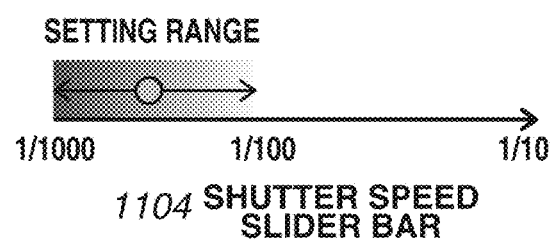
1104 SHUTTER SPEED SLIDER BAR
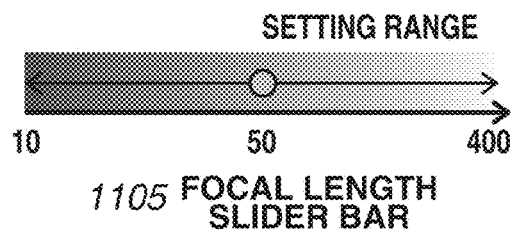
1105 FOCAL LENGTH SLIDER BAR
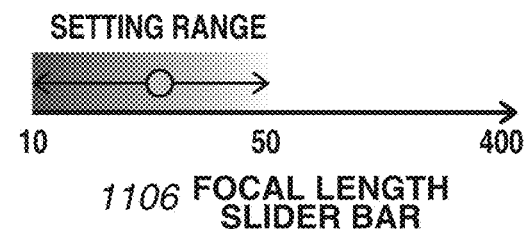
1106 FOCAL LENGTH SLIDER BAR
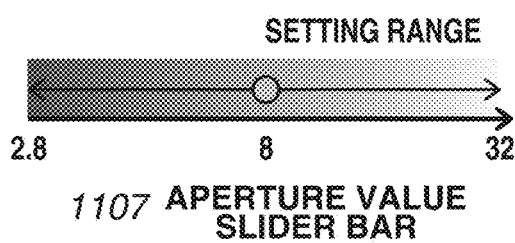
1107 APERTURE VALUE SLIDER BAR
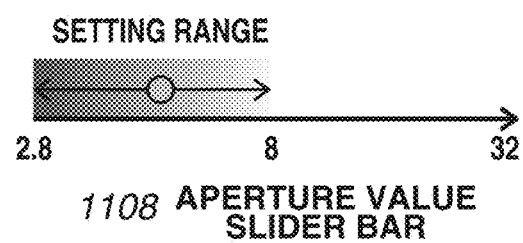
1108 APERTURE VALUE SLIDER BAR

FIG.12
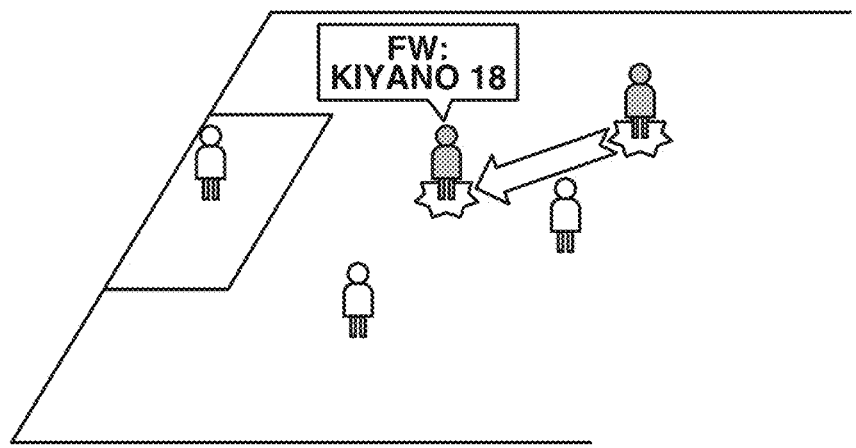
1201 EFFECT CONCEPT DIAGRAM
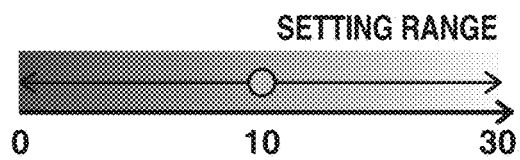
1202 DISPLAY NUMBER OF EFFECTS SLIDER BAR
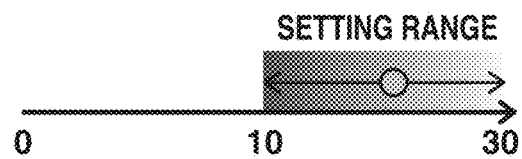
1203 DISPLAY NUMBER OF EFFECTS SLIDER BAR
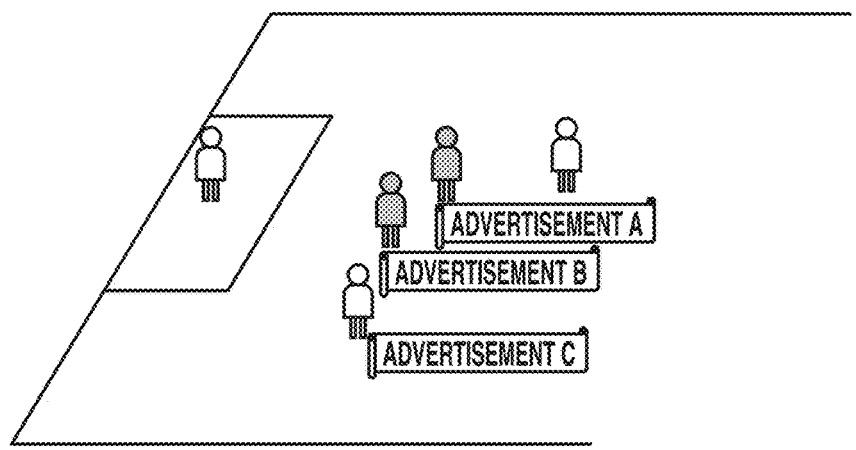
1204 EFFECT CONCEPT DIAGRAM
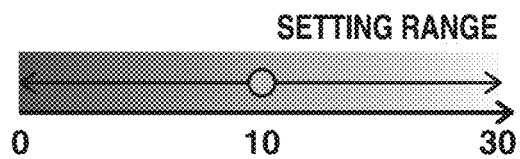
1205 DISPLAY NUMBER OF ADVERTISEMENTS SLIDER BAR
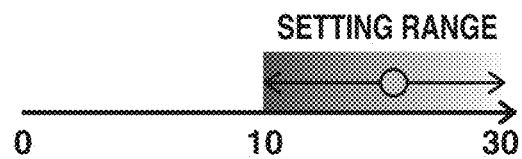
1206 DISPLAY NUMBER OF ADVERTISEMENTS SLIDER BAR

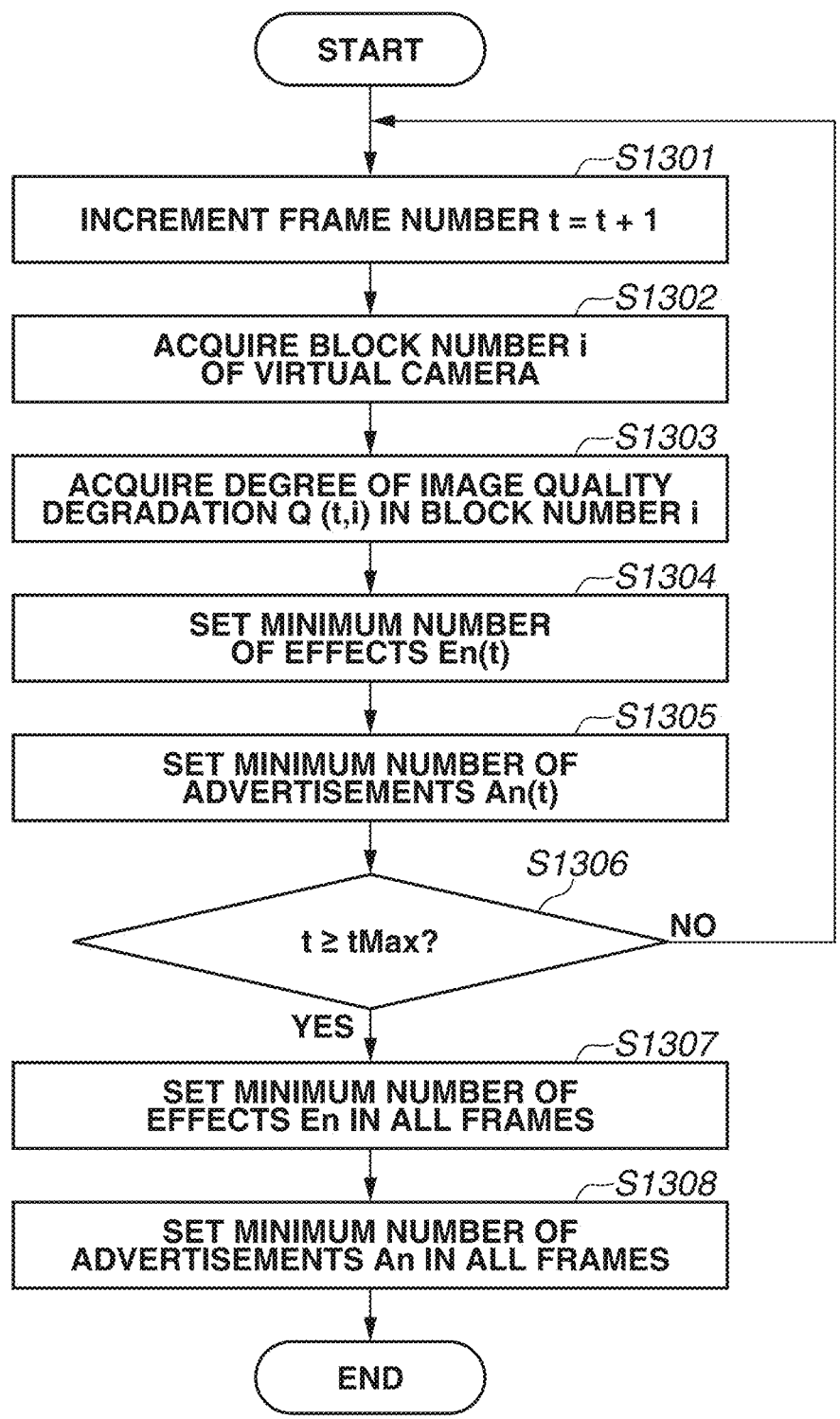

SETTING APPARATUS, SETTING METHOD, AND STORAGE MEDIUM

BACKGROUND

Field of the Disclosure

The present disclosure relates to a method for setting parameters of a virtual viewpoint relating to a virtual viewpoint video.

Description of the Related Art

There is a virtual viewpoint video technique (also referred to as a free viewpoint video) as a technique for reproducing a video from a camera (hereinafter referred to as a virtual camera) virtually arranged in a three-dimensional space by using videos captured by a plurality of actual cameras. In a case where a virtual viewpoint video is generated, a position, an orientation, and a viewing angle of the virtual camera are appropriately set in a chronological manner (hereinafter referred to as a virtual camera path). However, in some cases, quality of a virtual viewpoint video may be degraded depending on a virtual camera path. This is caused by a characteristic of a camera or an algorithm for generating a virtual viewpoint video. Thus, when a virtual camera path is to be set, attention needs to be paid to such factors of image quality degradation. Japanese Patent No. 4671873 discusses a restriction to be imposed on an installation position of a virtual camera to deal with such a problem.

However, the use of the method discussed in Japanese Patent No. 4671873 may excessively restrict the installation position of the virtual camera.

SUMMARY

According to an aspect of the present disclosure, a setting method for setting a parameter of a virtual viewpoint relating to a virtual viewpoint video to be generated based on images captured by a plurality of cameras includes receiving a first user operation relating to a first parameter relating to a position of a virtual viewpoint, determining a settable range of a second parameter of the virtual viewpoint by using the first parameter based on the received first user operation, and setting the first parameter based on the received first user operation and the second parameter that is based on a second user operation different from the first user operation and falls within the determined settable range as parameters of the virtual viewpoint.

Further features of the present disclosure will become apparent from the following description of exemplary embodiments with reference to the attached drawings.

BRIEF DESCRIPTION OF THE DRAWINGS

FIG. 3 is a diagram illustrating a graphical user interface (GUI) for setting a virtual camera path.

FIG. 9 is a diagram illustrating a method for visualizing a degree of video generation difficulty.

FIG. 10 is a diagram illustrating a method for visualizing a degree of image quality degradation.

FIG. 11 is a diagram illustrating a method for limiting each of various parameters.

FIG. 12 is a diagram illustrating methods for limiting the number of effects and the number of advertisements.

FIG. 13 is a flowchart illustrating a method for calculating limit values of the number of effects and the number of advertisements.

DESCRIPTION OF THE EMBODIMENTS

Figure 1:
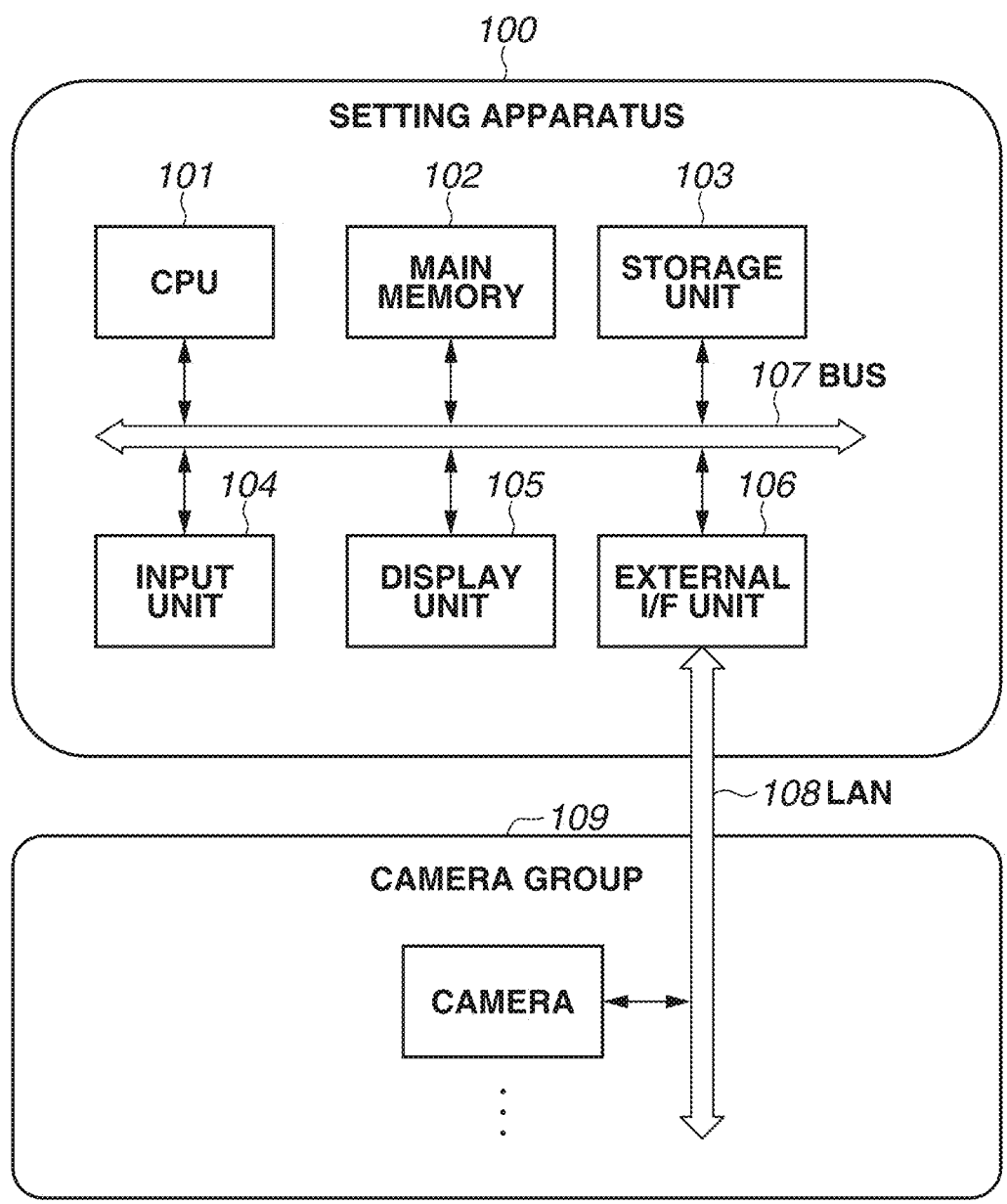
FIG. 1 is a block diagram illustrating a configuration of a system according to one or more aspects of the present disclosure.

Exemplary embodiments of the present disclosure are described with reference to the drawings. The exemplary embodiments described below are not intended to limit the scope of the present disclosure, and not all of the combinations of aspects described in the embodiments are necessarily required for a problem to be solved by the present disclosure. In description of similar configurations, the same reference numerals are given.

FIG. 1 is a block diagram illustrating a system configuration according to the present exemplary embodiment. A setting apparatus 100 includes a central processing unit (CPU) 101, a main memory 102, a storage unit 103, an input unit 104, a display unit 105, an external interface (I/F) unit 106, and a bus 107. The CPU 101 executes calculation processing and various programs. The main memory 102 provides, for example, a program, data, and a working area necessary for the execution of calculation processing and various programs, to the CPU 101. The storage unit 103 is a device for storing an image processing program and various data necessary for displaying a graphical user interface (GUI). For example, a non-volatile memory such as a hard disk and a silicon disk is used as the storage unit 103. The input unit 104 is a device such as a keyboard, a mouse, an electronic pen, and a touch panel. The input unit 104 receives an operation input from a user. The display unit 105 displays a GUI. The external I/F unit 106 is connected to a camera apparatus to transmit and receive video data and control signal data via a local area network (LAN) 108. The bus 107 connects each of the above-described units to transfer data. The present exemplary embodiment is mainly described using an example in which the setting apparatus 100 includes the display unit 105. However, the setting apparatus 100 and the display unit 105 may be separate apparatuses. The CPU 101 operates as a display control unit to display an image on the display unit 105.

A camera group 109 includes a plurality of cameras 203. The camera group 109 is connected to the setting apparatus 100 via the LAN 108. The camera group 109, based on control signals from the setting apparatus 100, starts and stops image capturing, changes camera settings (e.g., a shutter speed, a focal length, and an aperture value), and transfers captured image data. Alternatively, a control apparatus different from the setting apparatus 100 may control image capturing performed by the camera group 109. The system configuration is not limited to the above-described configuration. Although there are various modification examples of the system configuration, descriptions thereof are omitted.

Figure 2:
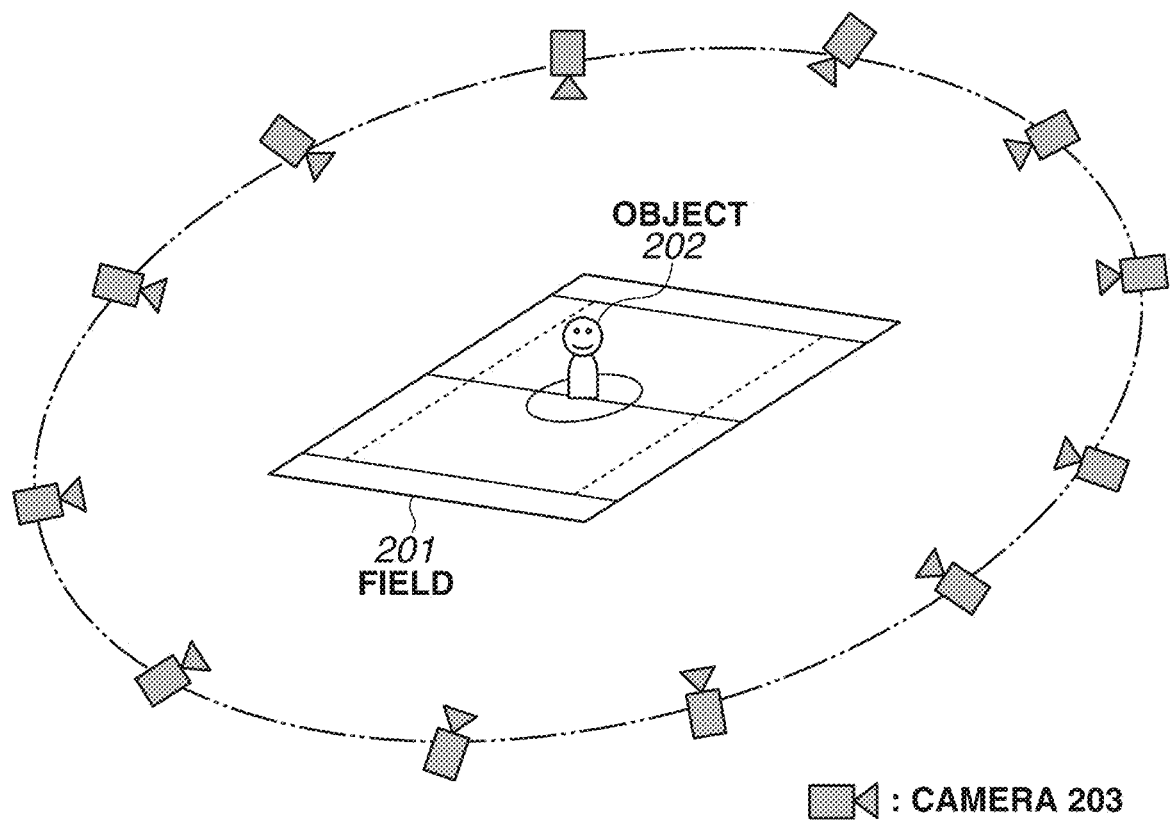
FIG. 2 is a schematic diagram illustrating arrangement of camera apparatuses.

FIG. 2 is a diagram illustrating arrangement of the plurality of cameras 203 of the camera group 109. Herein, a description is given of a case in which the plurality of cameras 203 is set in an arena where an event such as a sport takes place. In FIG. 2, there is an object 202 in a field 201 in which a game is played, and the plurality of cameras 203 is arranged so as to surround the field 201. Each of the cameras 203 is set to have an image capturing direction and a focal length so that the field 201 is fit within a viewing angle.

FIG. 3 is a diagram illustrating a graphical user interface (GUI) for setting a virtual camera path to be used when a virtual viewpoint video is generated. The GUI includes a bird's eye view preview window 301, operation buttons 302, and a camera path setting dialog 303. This GUI is displayed by the display unit 105. The bird's eye view preview window 301 is used for user operation for setting a virtual camera path and checking of the virtual camera path. The operation buttons 302 are used, for example, for reading of necessary input data. The camera path setting dialog 303 is used when details of the virtual camera path are set. Moreover, by pressing a video check button of the operation buttons 302, the bird's eye view preview window 301 switches to a virtual viewpoint video preview window 304 to display a virtual viewpoint video that is a video seen from the virtual camera.

Figure 4:
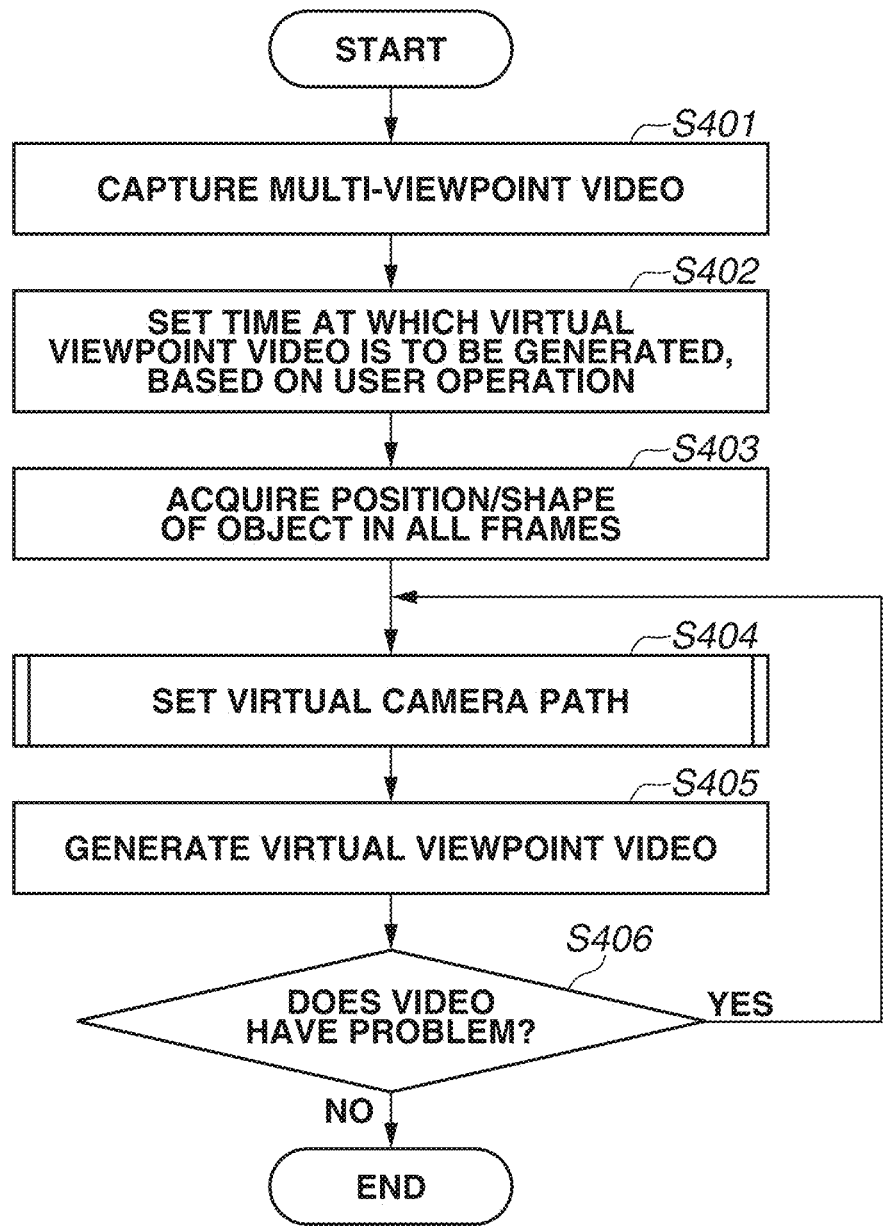
FIG. 4 is a flowchart illustrating processing for generating a virtual viewpoint video.

FIG. 4 is a flowchart illustrating processing for generating a virtual viewpoint video. In the setting apparatus 100 according to the present exemplary embodiment, the CPU 101 reads a predetermined program stored in the storage unit 103 to execute the predetermined program, so that various processing of the flowchart illustrated in FIG. 4 is executed. Hardware other than the CPU 101 may execute at least one portion of the various processing of the flowchart of the present exemplary embodiment.

In step S401, the CPU 101 transmits a signal to change camera settings to obtain an appropriate exposure amount at the time of image capturing, and a signal to start image capturing, to the camera group 109. The camera group 109 starts the image capturing, and transmits video data to the setting apparatus 100 via the LAN 108. In step S402, out of the video data acquired from the camera group 109, time information (information about a starting time and an ending time of a virtual viewpoint video) that is a target of generation of a virtual viewpoint video is set. The time information is set based on a user operation. However, for example, a default may be set so that the start of image capturing and the end of the image capturing are respectively a starting time and an ending time of a virtual viewpoint video.

In step S403, the CPU 101 uses a plurality of captured images (video frames) identified by the time information to estimate a position and a three-dimensional shape of the object 202. More specifically, if a starting time is 1 and an ending time is 9, the CPU 101 estimates shape of 0 or more objects from images that are captured by all of cameras at a time 1, and then estimates a shape or shapes of 0 or more objects from images that are captured by all of cameras at a time 2. Such processing is repeated until a time 9. An example of the method for estimating a position and a shape of an object includes an existing method such as a visual-hull method using object outline information and a multi-view stereo method using triangulation. The estimated position and shape of the object are stored in the storage unit 103.

In step S404, the CPU 101 sets a virtual camera path that will be described in detail below. In step S405, the CPU 101 generates a virtual viewpoint video by using the virtual camera path. As for the virtual viewpoint video generation, a computer graphics technique is used to generate a video seen from a virtual camera with respect to a three-dimensional shape of the object. In step S406, the CPU 101 checks image quality of the generated virtual viewpoint video by a user pressing the video check button of the operation buttons 302. The virtual viewpoint video is displayed on the virtual viewpoint video preview window 304. If the virtual viewpoint video does not have a problem (NO in step S406), the processing ends. If the virtual viewpoint video has a problem (YES in step S406), the processing returns to step S404 and the user edits the virtual camera path. If the user does not press the video check button, the processing in step S406 can be omitted. Alternatively, the virtual viewpoint video may be automatically displayed in a preview manner when the virtual camera path is set, regardless of whether the user operation is performed.

Figure 5:
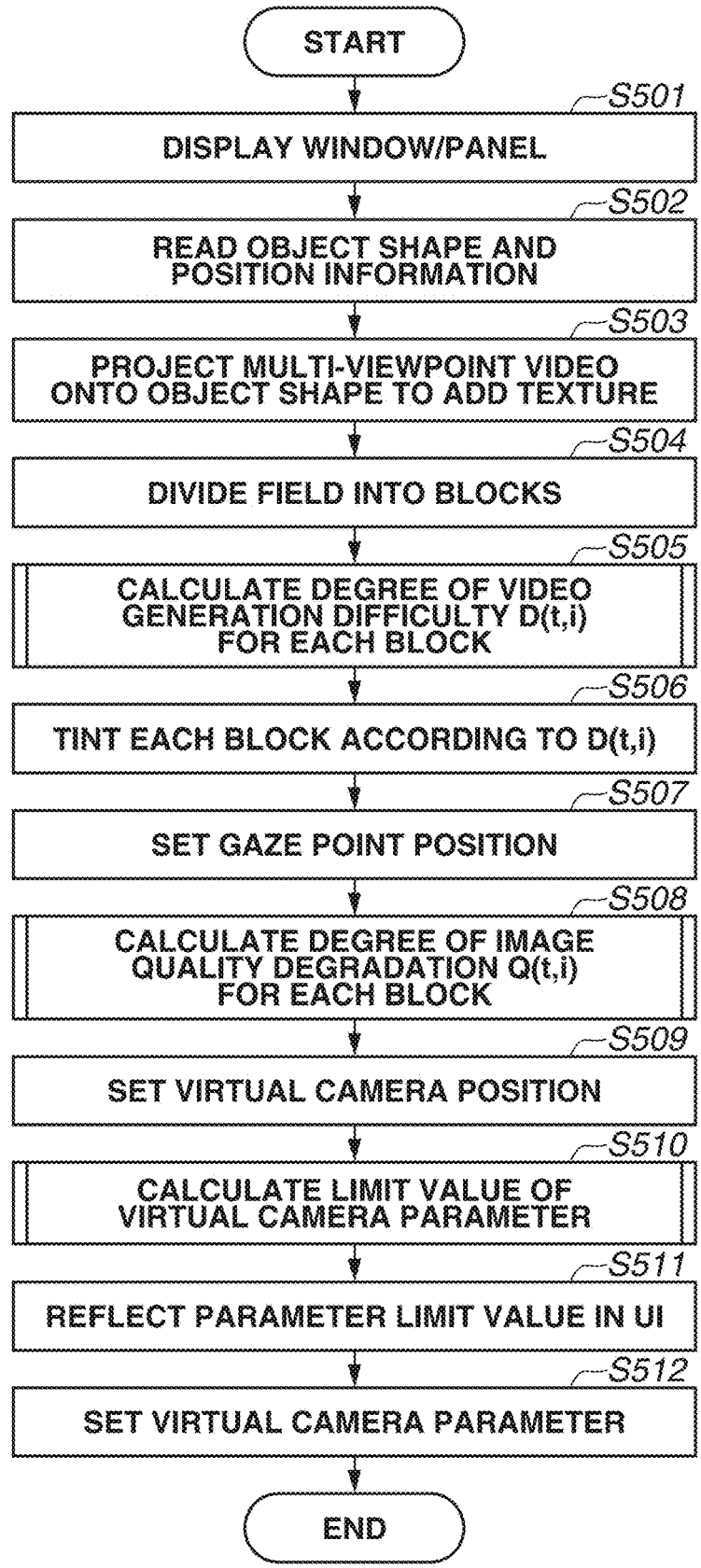
FIG. 5 is a flowchart illustrating processing for setting a virtual camera path.

FIG. 5 is a flowchart illustrating details of the processing in step S404 illustrated in FIG. 4. In step S501, the CPU 101 displays the GUI illustrated in FIG. 3 on the display unit 105. In step S502, the user presses an object information reading button and a field information reading button in sequence. Then, a three-dimensional map of the field, and the object position and the object shape estimated in step S403 are read from the storage unit 103 to the main memory 102, so that the three-dimensional map of the field and the position and the shape of the object are displayed in the bird's eye view preview window 301. The three-dimensional map, and the position and the shape of the object may be automatically read regardless of whether the user has pressed the object information reading button and the field information reading button.

A display example of the bird's eye view preview window 301 includes a bird's-eye view 901 illustrated in FIG. 9. In step S503, the CPU 101 projects captured multi-viewpoint video onto the estimated object shape, and adds texture such as a face of the object, uniform, and a uniform number. The present exemplary embodiment is mainly described using an example in which data estimated from the actual video by using a method such as a visual-hull method is used as an object shape. However, the object shape is not limited thereto. For example, generic three-dimensional shape data prepared beforehand may be used as an object shape. In step S504, the CPU 101 divides the three-dimensional map of the field into areas each having a prescribed size. In the present exemplary embodiment, block division is used as an example. A block can have a rectangular parallelepiped shape, for example, having a size of 2 m×2 m×2 m. A block division result 902 illustrated in FIG. 9 indicates a result of the block division.

In step S505, the CPU 101 calculates a degree of video generation difficulty $D(t, i)$ for each divided block. This processing will be described in detail below. In step S506, the CPU 101 tints each block based on the degree of video generation difficulty. A difficulty-degree visualization result 903 illustrated in FIG. 9 indicates a tinting result. A color is darken in proportion to an increase in degree of video generation difficulty. In step S507, the user sets a gaze point position of the virtual camera in consideration of the tinting result. In the present exemplary embodiment, the gaze point position represents a position based on an intersection of an optical axis (virtual optical axis) of the virtual camera and an image capturing target surface of the virtual camera. A gaze point setting result 1001 illustrated in FIG. 10 indicates a gaze point setting result. The gaze point positions are set as three-dimensional coordinate values for all video frames, and a trajectory thereof is displayed as a gaze point trajectory 1005. Moreover, a gaze point position 1006 in a current frame is indicated by a cross. A gaze point setting result 1001 indicates a gaze point position in a first video frame (t=1), and a gaze point setting result 1003 indicates a gaze point position in a second video frame (t=2).

In step S508, the CPU 101 calculates a degree of image quality degradation Q(t, i) for each block of the virtual viewpoint video based on the gaze point position, and reproduces the video with tint. As shown in image quality degradation-degree visualization results 1002 and 1004 illustrated in FIG. 10, a color is darken in proportion to an increase in degree of image quality degradation. In step S509, the user sets a position and an orientation (first parameter) of the virtual camera based on the degree of image quality degradation. For this reason, in step S509, the setting apparatus 100 receives the user operation relating to the first parameter related to a position of the virtual viewpoint. A position of the virtual camera is set as three-dimensional coordinate values for each video frame included in the virtual viewpoint video. In step S510, parameters (second parameters) to be set in the virtual camera are determined. The second parameters includes settable ranges (upper limit value and/or lower limit value) of a video playback speed, a shutter speed, a focal length, an aperture value, the number of display effects, and/or the number of display advertisements. The processing in step S510 will be described in detail below.

In step S511, the CPU 101 reflects the settable ranges in a user interface (UI). A result of such reflection is illustrated in FIG. 11. In various slider bars displayed in the camera path setting dialog 303, slider bars 1101, 1103, 1105, and 1107 indicate pre-reflection of limit values, whereas slider bars 1102, 1104, 1106, and 1108 indicate post-reflection of limit values by which settable values are limited. In this way, the setting apparatus 100 causes a settable range image indicating a settable range about virtual camera parameters to be displayed on a display device. In step S512, the user uses the UI in which the settable range is reflected to set various virtual camera parameters, and then a series of the operations ends.

Figure 6:
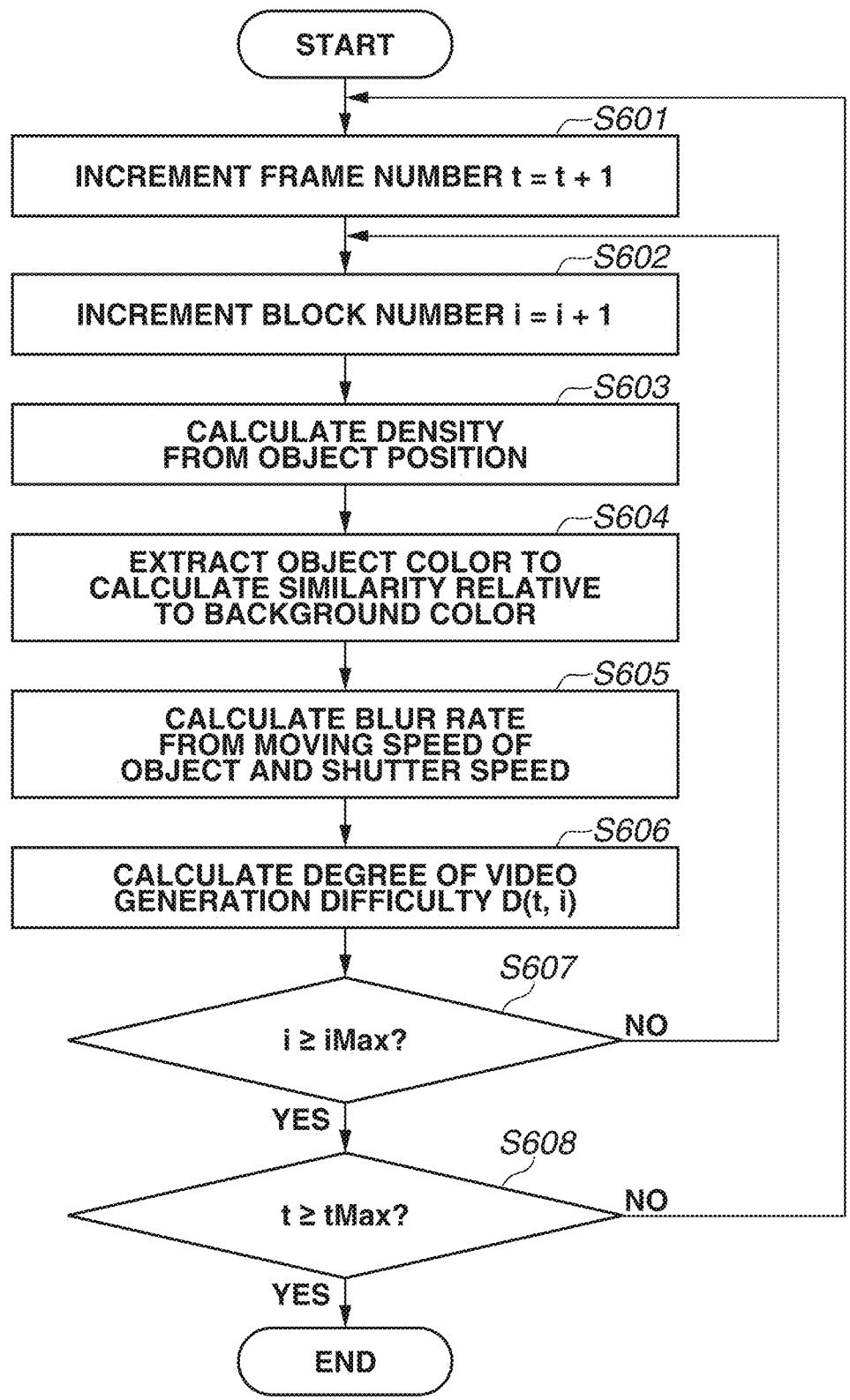
FIG. 6 is a flowchart illustrating processing for calculating a degree of video generation difficulty.

FIG. 6 is a flowchart illustrating details of the processing in step S505 illustrated in FIG. 5. The present exemplary embodiment is described using an example in which processing is executed on all video frames (tMax) and all blocks (iMax) of the field. Hereinafter, a frame number is described as a variable t, and a block number is described as a variable i. Each of the variables t and i is initialized with zero (0). In step S601, the CPU 101 increments the frame number t by 1. In step S602, the CPU 101 increments the block number i by 1. In step S603, the CPU 101 calculates a density E of objects (e.g., human figures) in a block B(t, i) of the block number i in the frame number t from position information of the object. The density is determined based on the number of objects inside a block.

In step S604, the CPU 101 extracts an object color from the object (e.g., human figure) inside the block B(t, i) to calculate a similarity S relative to a background color. More specifically, the CPU 101 extracts color information from texture of the object projected in step S503, and determines an inner product of an area (the number of pixels) occupied by such a color and a color difference relative to the background color, thereby calculating the similarity S. If a game is a football game, the CPU 101 extracts colors of uniform, hair, and skin from texture, and areas thereof, and calculates a color difference between the color of each of the uniform, hair, and skin, and a color of lawn (i.e., background). A difference of red, green, and blue (RGB) values or a difference of Lab values is used as the color difference. As for the method for calculating a similarity S between an object color and a background color, note that there are various modification examples.

In step S605, the CPU 101 calculates a motion blur occurrence rate M of the multi-viewpoint video. The motion blur occurrence rate M is determined by a moving speed of an object and a shutter speed at the time of image capturing by the camera group 109. If a shutter speed is ¹⁄₁₀₀ [s], the number of pixels within the video in which the object moves over ¹⁄₁₀₀ [s] is calculated from a moving speed. Such a calculated value is set as the motion blur occurrence rate M. The method for calculating the motion blur occurrence rate M is not limited thereto. For example, a motion blur occurrence rate M can be calculated from only a moving speed of an object, or can be calculated based on a moving acceleration in addition to the moving speed of the object.

In step S606, the CPU 101 integrates the density E, the similarity S, and the motion blur occurrence rate M to calculate a degree of video generation difficulty D(t, i). The method for calculating the degree of video generation difficulty D is not limited thereto. Any one value of the density E, the similarity S, and the motion blur occurrence rate M can be used as a degree of video generation difficulty D, or a combination of any two values of the density E, the similarity S, and the motion blur occurrence rate M can be used as a degree of video generation difficulty D. Alternatively, predetermined weights may be assigned to the density E, the similarity S, and the motion blur occurrence rate M, and then the resultant values may be integrated to calculate a degree of video generation difficulty D.

In step S607, the CPU 101 evaluates whether the block number i is greater than or equal to iMax (i.e., i≥iMax). If the block number i is greater than or equal to iMax (YES in step S607), the processing proceeds to step S608. If the block number i is smaller than iMax (NO in step S607), the processing returns to step S602. In step S608, the CPU 101 evaluates whether the frame number t is greater than or equal to tMax (i.e., t≥tMax). If the frame number t is smaller than tMax (NO in step S608), the processing proceeds to step S601. If the frame number t is greater than or equal to tMax (YES in step S608), a series of the processing ends.

FIG. 9 illustrates a result that the degree of video generation difficulty D calculated by the above processing is visualized. The difficulty-degree visualization result 903 represents a degree of video generation difficulty for each block in a frame number 1. Darkness of color and a degree of video generation difficulty D have a proportional relation. Thus, a block in which objects are densely present, or a block including an object having a color similar to a background color (white in this case) can be recognized to have a darker color. For a frame number 2, for example, a difficulty-degree visualization result 904 is provided. The present exemplary embodiment is mainly described using an example in which a degree of video generation difficulty D is determined for all of times within the period set in step S402 of the flowchart illustrated in FIG. 4. However, the present exemplary embodiment is not limited thereto. For example, a degree of video generation difficulty D can be determined for each predetermined time period. In such a case, a processing load of the flowchart illustrated in FIG. 6 can be reduced.

Figure 7:
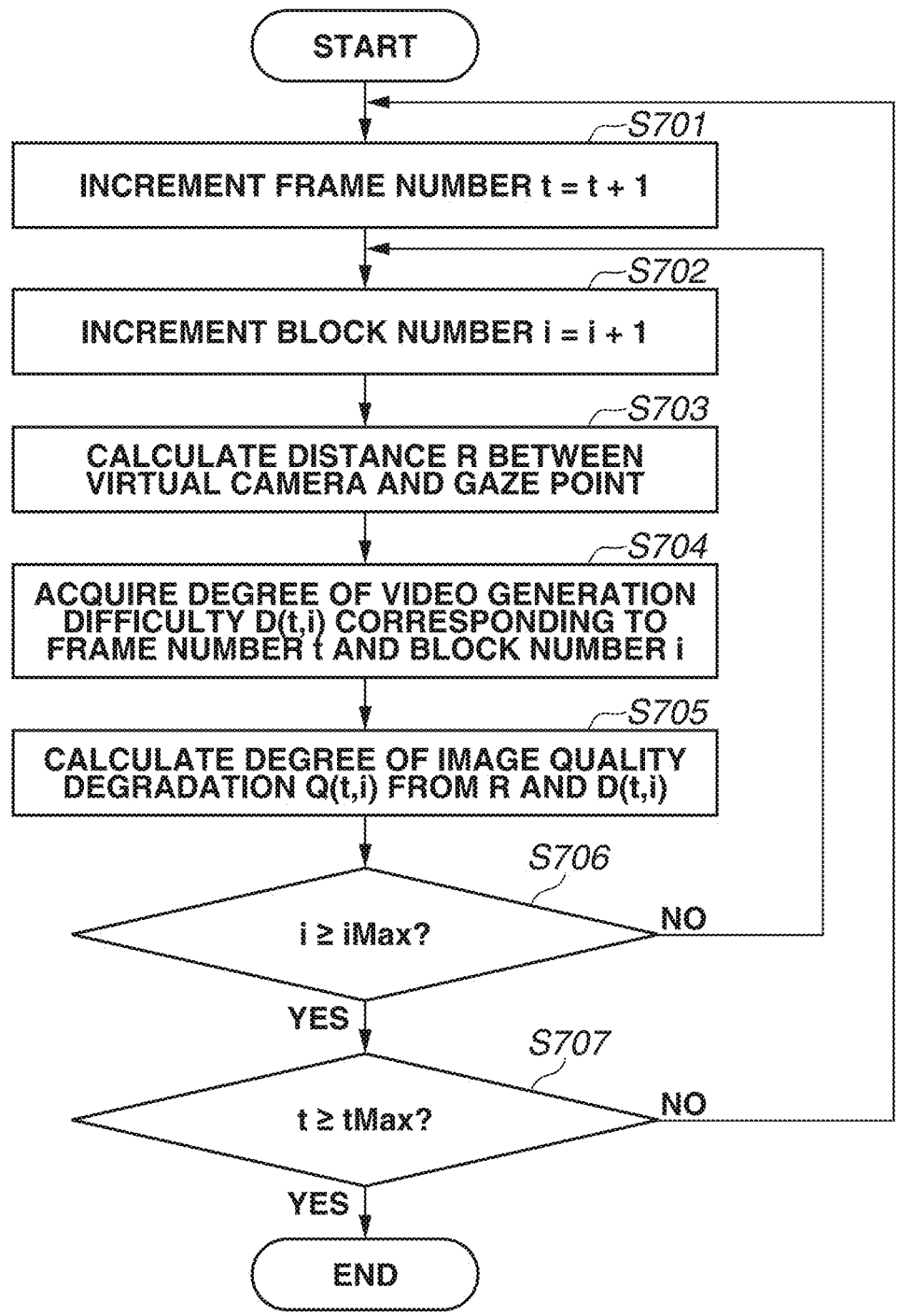
FIG. 7 is a flowchart illustrating processing for calculating a degree of image quality degradation.

FIG. 7 is a flowchart illustrating details of the processing in step S508 of the flowchart illustrated in FIG. 5. The present exemplary embodiment is described using an example in which processing is executed for all video frames (tMax) and all blocks (iMax) of the field. Hereinafter, a frame number is described as a variable t, and a block number is described as a variable i. Each of the variables t and i is initialized with zero (0). In step S701, the CPU 101 increments a frame number t by 1. In step S702, the CPU 101 increments a block number i by 1. In step S703, the CPU 101 calculates a distance R between a position of the virtual camera and a position of a gaze point. In step S704, the CPU 101 acquires a degree of video generation difficulty D(t, i) corresponding to the frame number t and the block number i. In step S705, the CPU 101 calculates a degree of image quality degradation Q(t, i) from the distance R and the degree of video generation difficulty D(t, i). Although various methods for calculating a degree of image quality degradation Q are conceivable, a degree of image quality degradation Q can be simply calculated by dividing a degree of video generation difficulty D(t, i) by a distance R. Alternatively, a degree of video generation difficulty D or a distance R may be multiplied by a predetermined coefficient and then a resultant value may be divided, or a table in which a relation between a combination of a distance R and a degree of video generation difficulty D and a degree of image quality degradation Q is prescribed beforehand may be used as a calculation method.

In step S706, the CPU 101 evaluates whether the block number i is greater than or equal to iMax (i.e., i≥iMax). If the block number i is greater than or equal to iMax (YES in step S706), the processing proceeds to step S707. If the block number i is smaller than iMax (NO in step S706), the processing returns to step S702. In step S707, the CPU 101 evaluates whether the frame number t is greater than or equal to tMax (i.e., t≥tMax). If the frame number t is smaller than tMax (NO in step S707), the processing returns step S701. If the frame number t is greater than or equal to tMax (YES in step S707), a series of the processing ends. FIG. 10 illustrates a result that the degree of image quality degradation Q calculated by the above processing is visualized. The image quality degradation-degree visualization result 1002 represents a degree of image quality degradation Q in the frame number 1. Darkness of color and a degree of image quality degradation Q have a proportional relation. Thus, a block nearer to a gaze point 1006 can be recognized to have a darker color. Moreover, the image quality degradation-degree visualization result 1004 represents a visualization result of a degree of image quality degradation Q in the frame number 2. In the frame number 2, since a gaze point 1007 is set near objects that are densely present, dark color blocks are distributed in a wider range in comparison with the frame number 1.

Figure 8:
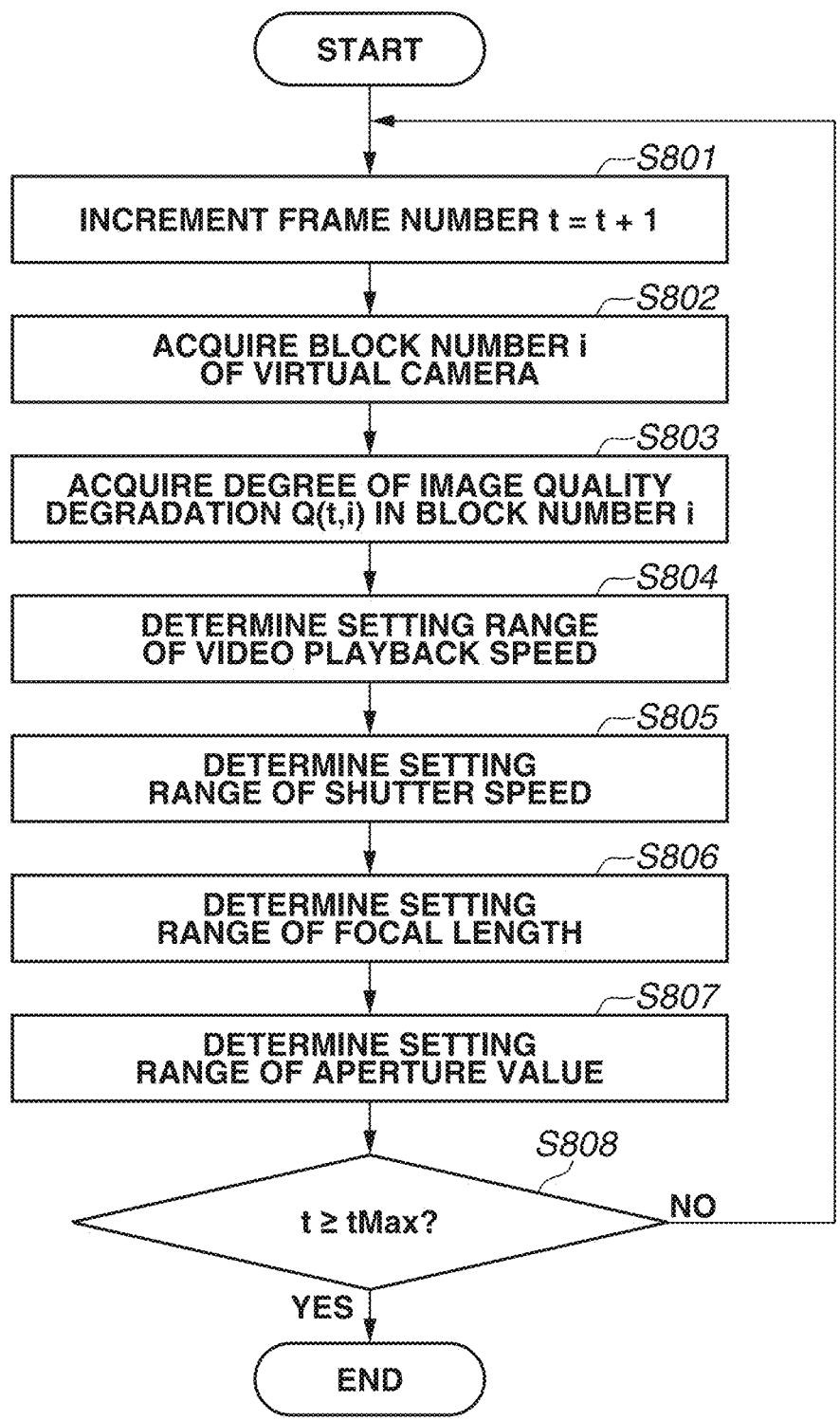
FIG. 8 is a flowchart illustrating a method for calculating a parameter limit value.

FIG. 8 is a flowchart illustrating details of the processing in step S510 of the flowchart illustrated in FIG. 5. The present exemplary embodiment is described using an example in which processing is executed for all video frames (tMax). A frame number is described as a variable t. The variable t is initialized with zero (0). In step S801, the CPU 101 increments the frame number t by 1. In step S802, the CPU 101 acquires a block number i including a virtual camera from a three-dimensional position of the virtual camera in the frame number t. In step S803, the CPU 101 acquires a degree of image quality degradation Q(t, i) in the block number i.

In step S804, the CPU 101 uses the degree of image quality degradation Q to limit a settable range of playback speed of the virtual viewpoint video. The playback speed of the virtual viewpoint video is set by using a video playback speed slider bar 1101 illustrated in FIG. 11. This slider bar 1101 is displayed in the camera path setting dialog 303. The slider bar 1101 has a numeric value "1" that indicates a constant playback speed. A playback speed increases as the slider bar 1101 is moved toward the right, whereas a playback speed decreases as the slider bar 1101 is moved toward the left. A virtual viewpoint video has a characteristic in which degradation in image quality becomes visually less notable if a playback speed becomes higher. Accordingly, if a degree of image quality degradation Q is high, a playback speed settable in a wider range as the slider bar 1101 is normally restricted so as to limit a playback speed settable range to only a higher speed region as a slider bar 1102 (i.e., the playback speed settable range is narrowed). The limit speed herein is retained beforehand in a table including an appropriate value corresponding to a degree value of image quality degradation Q. More specifically, in a case when the virtual viewpoint video include an area with image quality lower than a threshold value, the setting apparatus 100 causes a settable range of playback speed of the virtual viewpoint video to be narrower than that in a case where the virtual viewpoint video does not include an area with image quality lower than the threshold value. The user sets a playback speed within the narrowed settable range.

In step S805, with use of the degree of image quality degradation Q, the CPU 101 imposes limitations on a setting range of shutter speed of the virtual camera. The shutter speed of the virtual camera is set by using a shutter speed slider bar 1103 illustrated in FIG. 11. This slider bar 1103 is displayed in the camera path setting dialog 303. The slider bar 1103 has a numeric value that indicates a shutter speed. A shutter speed decreases as the slider bar 1103 is moved toward the right, whereas a shutter speed increases as the slider bar 1103 is moved toward the left. There are characteristics in which a motion blur tends to occur and degradation in image quality becomes visually less notable if a shutter speed of the virtual camera is decreased. Accordingly, if a degree of image quality degradation Q is high, a shutter speed settable in a wider range as the slider bar 1103 is normally restricted so as to limit a shutter speed settable range to only a higher speed region as a slider bar 1104 (i.e., the shutter speed settable range is narrowed). In other words, in a case where the virtual viewpoint video includes an area with image quality lower than a threshold value, the setting apparatus 100 causes a settable range of shutter speed of the virtual viewpoint video to be narrower than that in a case where the virtual viewpoint video does not include an area with image quality lower than the threshold value. A limit speed herein is retained beforehand in a table including an appropriate value corresponding to a degree value of image quality degradation Q.

In step S806, with use of the degree of image quality degradation Q, the CPU 101 imposes limitation on a setting range of focal length of the virtual camera. The focal length of the virtual camera is set by using a focal length slider bar 1105 illustrated in FIG. 11. This slider bar 1105 is displayed in the camera path setting dialog 303. The slider bar 1105 has a numeric value that indicates a focal length value. A focal length increases (telephoto side) as the slider bar 1105 is moved toward the right, whereas a focal length decreases (wide-angle side) as the slider bar 1105 is moved toward the left. The virtual viewpoint video has a characteristic in which degradation in image quality becomes visually less notable if a focal length of the virtual camera is decreased (a wide-angle video). Accordingly, if a degree of image quality degradation Q is high, a focal length settable in a wider range as the slider bar 1105 is normally restricted so as to limit a focal length settable range to only a short distance region as a slider bar 1106 (i.e., the focal length settable range is narrowed). In other words, in a case where the virtual viewpoint video includes an area with image quality lower than a threshold value, the setting apparatus 100 causes a settable range of focal length of the virtual viewpoint video to be narrower than that in a case where the virtual viewpoint video does not include an area with image quality lower than the threshold value. A limit distance herein is retained beforehand in a table including an appropriate value corresponding to a degree value of image quality degradation Q.

In step S807, with use of the degree of image quality degradation Q, the CPU 101 limits a setting range of aperture value of the virtual camera. The aperture value of the virtual camera is set by using an aperture value slider bar 1107 illustrated in FIG. 11. The slider bar 1107 is displayed in the camera path setting dialog 303. The slider bar 1107 has a numeric value that indicates an aperture value. An aperture value increases (an aperture hole becomes smaller) as the slider bar 1107 is moved toward the right, whereas an aperture value decreases (the aperture hole becomes larger) as the slider bar 1107 is moved toward the left. The virtual viewpoint video has a characteristic in which a decrease in an aperture value of the virtual camera increases a depth of field and thus degradation in image quality becomes visually less notable. Accordingly, if a degree of image quality degradation Q is high, an aperture value settable in a wider range as the slider bar 1107 is normally restricted so as to limit an aperture value settable range to only a low region as a slider bar 1108 (i.e., the aperture value settable range is narrowed). In other words, in a case where the virtual viewpoint video includes an area with image quality lower than a threshold value, the setting apparatus 100 causes a settable range of aperture value of the virtual viewpoint video to be narrower than that in a case where the virtual viewpoint video does not include an area with image quality lower than the threshold value. A limit aperture value herein is retained beforehand in a table including an appropriate value corresponding to a degree value of image quality degradation Q.

In step S808, the CPU 101 evaluates whether a frame number t is greater than or equal to tMax (i.e., t≥tMax). If the frame number t is smaller than tMax (NO in step S808), the processing returns to step S801. If the frame number t is greater than or equal to tMax (YES in step S808), a series of the processing ends. According to the configuration of the present exemplary embodiment, a degree of freedom of virtual camera setting can be enhanced while degradation in image quality of virtual viewpoint video is prevented.

Modification Example

The above exemplary embodiment has been mainly described using an example in which a virtual camera setting is controlled based on a degree of image quality degradation Q. Hereinafter, an example in which the number of effect images or advertisement images to be displayed is controlled based on a degree of image quality degradation Q. Generally, a frequent change of effect images or advertisement images to he superimposed on a virtual viewpoint video causes viewers to feel uncomfortable. Thus, it can be said that the present modification example provides a method for determining parameters to be applied to all video frames. However, the number of effect images or advertisement images to be displayed may be changed in the middle. Hereinafter, an image such as an effect image and an advertisement image to be superimposed on a virtual viewpoint video is collectively called a meta image.

FIG. 13 is a flowchart relating to a setting of the number of meta images and illustrates the processing in step S510 of the flowchart illustrated in FIG. 5. A frame number is represented by a variable t, and is initialized with zero (0). In step S1301, a CPU 101 increments a frame number t by 1. In step S1302, the CPU 101 acquires a block number i included in a virtual viewpoint video from a three-dimensional position of a virtual camera in the frame number t. In step S1303, the CPU 101 acquires a degree of image quality degradation Q(t, i) in the block number i. In step S1304, the CPU 101 calculates the minimum number of effects En(t) to he displayed in the frame t. As illustrated in an effect concept diagram 1201 in FIG. 12, an effect image includes, for example, an image that graphically expresses a movement trajectory of a player and an image that indicates a name of a player and information of the player. Degradation of the virtual viewpoint video becomes less notable as the number of effect images to be displayed becomes greater. Therefore, the number of effect images En is determined so as to increase the number of effect images as a degree of degradation in image quality becomes higher. The number of effects En(t) is retained beforehand in a table including an appropriate value corresponding to a degree of image quality degradation Q(t, i).

In step S1305, the CPU 101 calculates the minimum number of advertisements An(t) to be displayed in the frame t. An advertisement image includes a sponsor logo as illustrated in an effect concept diagram 1204 in FIG. 12, and degradation of the virtual viewpoint video becomes less notable as a larger number of advertisement images are displayed. Hence, the number of advertisements An is determined so as to increase the number of advertisement images as a degree of image quality degradation Q becomes higher. The number of advertisements An(t) is retained beforehand in a table including an appropriate value corresponding to a degree of image quality degradation Q(t, i). In step S1306, the CPU 101 evaluates whether the frame number t is greater than or equal to tMax (i.e., t≥tMax). If the frame number t smaller than tMax (NO in step S1306), the processing returns to step S1301. If the frame number t is greater than or equal to tMax (YES in step S1306), the processing proceeds to step S1307. In step S1307, the CPU 101 calculates a maximum value in the number of effects En(t) (1≤t≤tMax), and sets the calculated value as the number of effects En. The number of effects is set by using a display effect quantity slider bar 1202 illustrated in FIG. 12. The slider bar 1202 is displayed in a camera path setting dialog 303. The slider bar 1202 has a numeric value that indicates the number of effects. The number of effects increases as the slider bar 1202 is moved toward the right. In the present exemplary embodiment, if a degree of image quality degradation Q is high, the number of effects settable in a wider range as the slider bar 1202 is normally restricted so as to limit an effect quantity settable range as a slider bar 1203 (in this case, En≤the number of effects≤30). In other words, in a case where the virtual viewpoint video include an area with image quality lower than a threshold value, the setting apparatus 100 causes a settable range of the number of effect images to be superimposed on a virtual viewpoint video to be narrower than that in a case where the virtual viewpoint video does not include an area with image quality lower than the threshold value.

in step S1308, the CPU 101 calculates a maximum value in the number advertisements An(t) (1≤t≤tMax), and sets the calculated value as the number of advertisements An. The number of advertisements is set by using a display advertisement quantity slider bar 1205 illustrated in FIG. 12. This slider bar 1205 is displayed in the camera path setting dialog 303. The slider bar 1205 has a numeric value that indicates the number of advertisements. The number of advertisements increases as the slider bar 1205 is moved toward the right. In the present exemplary embodiment, if a degree of image quality degradation Q is high, the number of advertisements settable in a wider range as the slider bar 1205 is normally restricted so as to limit an advertisement quantity settable range as a slider bar 1206 (in this case, An≤the number of advertisements≤30). In other words, in a case where the virtual viewpoint video includes an area with image quality lower than a threshold value, the setting apparatus 100 causes a settable range of the number of advertisement images that are to be superimposed on a virtual viewpoint video to be narrower than that in a case where the virtual viewpoint video does not include an area with image quality lower than the threshold value. Accordingly, a degree of freedom of virtual camera setting can be enhanced while degradation in image quality of the virtual viewpoint video is prevented.

The above exemplary embodiment has been described using an example in which various parameters are set by slider bars, but is not limited thereto. For example, a parameter can be set by using a pull-down menu, or a user can input a numeric value in a text box to set a parameter. If the text box is used, an error message can be displayed in response to input of a value out of a limited range.

Moreover, the above exemplary embodiment has been mainly described using an example in which a degree of image quality degradation Q is determined based on a degree of video generation difficulty D, and a limited range of virtual parameter is determined from the degree of image quality degradation Q. However, the above exemplary embodiment is not limited thereto. For example, a limited range of virtual parameter may be directly determined from a degree of video generation difficulty D, or a degree of image quality degradation Q may be determined based on a parameter other than the degree of video generation difficulty D.

Moreover, the above modification example has been described using an example in which the number of effect images and the number of advertisement images are separately set, but is not limited thereto. For example, a settable range may be calculated for the total number of effect images and advertisement images. Alternatively, an image size may be considered instead of the number of images. Moreover, an image to be superimposed on a virtual viewpoint image is not limited to an effect image and an advertisement image. An image to be superimposed on a virtual viewpoint image can be various elements such as an image indicating a date and time and an image indicating weather.

According to the system described in the present exemplary embodiment, a degree of freedom of virtual camera setting can be enhanced while degradation in image quality of the virtual viewpoint video is prevented.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-229879, filed Nov. 30, 2017, which is hereby incorporated by reference herein in its entirety.

What is claimed is:

1. A setting apparatus comprising:
one or more hardware processors; and
one or more memories storing one or more programs configured to be executed by the one or more hardware processors, the one or more programs including instructions for:
determining whether a virtual viewpoint image to be generated based on a first parameter includes an area with image quality lower than a threshold value, the first parameter being a parameter relating to a position of a virtual viewpoint for a virtual viewpoint image to be generated based on images captured by a plurality of image capturing apparatuses;
determining a settable range of a second parameter of the virtual viewpoint, the settable range of the second parameter being determined, in a case where the virtual viewpoint image is determined to include an area with image quality lower than the threshold value, so as to cause a settable range to be narrower than that in a case where the virtual viewpoint image is determined not to include an area with image quality lower than the threshold value, the second parameter being a parameter relating to the virtual viewpoint image to be generated based on the images captured by the plurality of image capturing apparatuses; and
setting the second parameter within the determined settable range as a parameters of the virtual viewpoint for the virtual viewpoint image,
wherein the virtual viewpoint image is a virtual viewpoint video which comprises a plurality of frame of images captured by the plurality of image capturing apparatuses.

2. The setting apparatus according to claim 1,
wherein the one or more programs further include instructions for causing a display device to display a settable range image indicating the determined settable range of the second parameter, and
wherein the second parameter is set in accordance with a user operation with respect to the settable range image displayed by the display device.

3. The setting apparatus according to claim 1, wherein the second parameter is at least one of a playback speed of the virtual viewpoint video, a shutter speed for the virtual viewpoint video, a focal length for the virtual viewpoint video, an aperture value for the virtual viewpoint video, and number of images to be superimposed on the virtual viewpoint video.

4. The setting apparatus according to claim 1,
wherein, in a case where the virtual viewpoint video is determined to include an area with image quality lower than the threshold value, a settable range of the second parameter is determined so as to cause a settable range of playback speed of the virtual viewpoint video to be narrower than that in a case where the virtual viewpoint video is determined not to include an area with image quality lower than the threshold value.

5. The setting apparatus according to claim 4, wherein the image quality is determined according to a degree of density of a plurality of objects in the virtual viewpoint video to be generated based on the first parameter.

6. The setting apparatus according to claim 4, wherein the image quality is determined based on a distance between a position of a virtual viewpoint set as the first parameter and an object included in the virtual viewpoint video.

7. The setting apparatus according to claim 4, wherein the image quality is determined based on a moving speed of an object in the virtual viewpoint video to be generated based on the first parameter.

8. The setting apparatus according to claim 1,
wherein, in a case where the virtual viewpoint video is determined to include an area with image quality lower than the threshold value, a settable range of the second parameter is determined so as to cause a settable range of shutter speed for the virtual viewpoint video to be narrower than that in a case where the virtual viewpoint video is determined not to include an area with image quality lower than the threshold value.

9. The setting apparatus according to claim 1,
wherein, in a case where the virtual viewpoint video is determined to include an area with image quality lower than the threshold value, a settable range of the second parameter is determined so as to cause a settable range of focal length for the virtual viewpoint video to be narrower than that in a case where the virtual viewpoint video is determined not to include an area with image quality lower than the threshold value.

10. The setting apparatus according to claim 1,
wherein, in a case where the virtual viewpoint video is determined to include an area with image quality lower than the threshold value, a settable range of the second parameter is determined so as to cause a settable range of aperture value for the virtual viewpoint video to be narrower than that in a case where the virtual viewpoint video is determined not to include an area with image quality that is lower than the threshold value.

11. The setting apparatus according to claim 1,
wherein, in a case where the virtual viewpoint video is determined to include an area with image quality that is lower than the threshold value, a settable range of the second parameter is determined so as to cause a settable range relating to number of images to be superimposed on the virtual viewpoint video to be narrower than that in a case where the virtual viewpoint video is determined not to include an area with image quality lower than the threshold value.

12. The setting apparatus according to claim 11, wherein the image to be superimposed on the virtual viewpoint video is at least any of information about a human figure in the virtual viewpoint video, and an advertisement to be superimposed on the virtual viewpoint video.

13. A setting method comprising:
determining whether a virtual viewpoint image to be generated based on a first parameter includes an area with image quality lower than a threshold value, the first parameter being a parameter relating to a position of a virtual viewpoint for a virtual viewpoint image to be generated based on images captured by a plurality of image capturing apparatuses;
determining a settable range of a second parameter of the virtual viewpoint, the settable range of the second parameter being determined, in a case where the virtual viewpoint image is determined to include an area with image quality lower than the threshold value, so as to cause a settable range to be narrower than that in a case where the virtual viewpoint image is determined not to include an area with image quality lower than the threshold value, the second parameter being a parameter relating to the virtual viewpoint image to be generated based on the images captured by the plurality of image capturing apparatuses; and
setting the second parameter within the determined settable range as a parameters of the virtual viewpoint for the virtual viewpoint image, and
wherein the virtual viewpoint image is a virtual viewpoint video which comprises a plurality of frame of images captured by the plurality of image capturing apparatuses.

14. A non-transitory computer-readable storage medium storing a program for causing a computer to execute a setting method, the setting method comprising:
determining whether a virtual viewpoint image to be generated based on a first parameter includes an area with image quality lower than a threshold value, the first parameter being a parameter relating to a position of a virtual viewpoint for a virtual viewpoint image to be generated based on images captured by a plurality of image capturing apparatuses;
determining a settable range of a second parameter of the virtual viewpoint, the settable range of the second parameter being determined, in a case where the virtual viewpoint image is determined to include an area with image quality lower than the threshold value, so as to cause a settable range to be narrower than that in a case where the virtual viewpoint image is determined not to include an area with image quality lower than the threshold value, the second parameter being a parameter relating to the virtual viewpoint image to be generated based on the images captured by the plurality of image capturing apparatuses; and
setting the second parameter within the determined settable range as a parameter of the virtual viewpoint for the virtual viewpoint image,
wherein the virtual viewpoint image is a virtual viewpoint video which comprises a plurality of frame of images captured by a plurality of image capturing apparatuses.

15. The setting apparatus according to claim 1,
wherein the settable range of the second parameter of the virtual viewpoint is based on the first parameter and capturing statuses at multiple timings in a capturing period by the plurality of image capturing apparatuses.

* * * * *